(12) United States Patent
Matsunami et al.

(10) Patent No.: US 12,434,732 B2
(45) Date of Patent: Oct. 7, 2025

(54) UNMANNED VEHICLE COOPERATION SYSTEM, UNMANNED VEHICLE COACTION PROCESSING METHOD, AND PROGRAM

(71) Applicant: MITSUBISHI HEAVY INDUSTRIES, LTD., Tokyo (JP)

(72) Inventors: Natsuki Matsunami, Tokyo (JP); Sotaro Karakama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 297 days.

(21) Appl. No.: 17/635,933

(22) PCT Filed: Jun. 29, 2020

(86) PCT No.: PCT/JP2020/025516
§ 371 (c)(1),
(2) Date: Feb. 16, 2022

(87) PCT Pub. No.: WO2021/039093
PCT Pub. Date: Mar. 4, 2021

(65) Prior Publication Data
US 2022/0332344 A1 Oct. 20, 2022

(30) Foreign Application Priority Data
Aug. 30, 2019 (JP) .............................. 2019-158885

(51) Int. Cl.
*B60W 60/00* (2020.01)
*G06F 9/448* (2018.01)

(52) U.S. Cl.
CPC ......... *B60W 60/001* (2020.02); *G06F 9/4498* (2018.02)

(58) Field of Classification Search
CPC ....... B60W 60/001; G08G 1/166; G08G 3/02; G08G 5/04
See application file for complete search history.

(56) References Cited

U.S. PATENT DOCUMENTS 6,377,878 B1 * 4/2002 Feddema ............. G05D 1/0221
701/532
7,343,222 B2 3/2008 Solomon
(Continued)

FOREIGN PATENT DOCUMENTS

CN 105700553 A 6/2016
JP 2000029847 A 1/2000
(Continued)

OTHER PUBLICATIONS

Extended European Search Report of European Application No. 20858472.2 mailed Jun. 27, 2022; 8pp.
(Continued)

*Primary Examiner* — Erin M Piateski
*Assistant Examiner* — Shelley Marie Osterhout
(74) *Attorney, Agent, or Firm* — HAUPTMAN HAM, LLP

(57) ABSTRACT

An unmanned vehicle cooperation system for a person to grasp the operation of an unmanned vehicle and to perform a smooth cooperation action with the unmanned vehicle. The unmanned vehicle cooperation system performs a cooperation action involving human intervention between a plurality of agents including an unmanned vehicle. The unmanned vehicle has a processing unit that performs an action processing of the unmanned vehicle with artificial intelligence using a decision making model established by including a plurality of tasks, the plurality of tasks include a cooperation task for performing the cooperation action, and the processing unit executes a consensus building processing that builds a consensus as to execution of the cooperation task between
(Continued)

the agents using a negotiation protocol, and a cooperation action processing that executes the cooperation action of the unmanned vehicle on the basis of the consented cooperation task.

11 Claims, 8 Drawing Sheets

(56) References Cited

U.S. PATENT DOCUMENTS

| | | | |
|---|---|---|---|
| 8,914,182 B2 | 12/2014 | Casado et al. | |
| 9,997,080 B1* | 6/2018 | Chambers | B64U 10/13 |
| 11,747,806 B1* | 9/2023 | Wootton | B60W 30/18154 |
| | | | 701/28 |
| 2014/0074339 A1* | 3/2014 | Casado | G05D 1/104 |
| | | | 701/24 |
| 2014/0081506 A1* | 3/2014 | Pack | B25J 9/1664 |
| | | | 701/27 |
| 2018/0196437 A1* | 7/2018 | Herbach | G05D 1/0231 |
| 2019/0171438 A1 | 6/2019 | Franchitti | |
| 2019/0289469 A1* | 9/2019 | Bentley | G08G 5/0021 |
| 2020/0082728 A1* | 3/2020 | Buchanan | G06Q 30/08 |
| 2021/0141373 A1* | 5/2021 | Bash | G08G 5/0013 |

FOREIGN PATENT DOCUMENTS

| | | |
|---|---|---|
| JP | 2000052284 A | 2/2000 |
| JP | 2000254837 A | 9/2000 |
| JP | 2002205289 A | 7/2002 |
| JP | 2005539296 A | 12/2005 |
| JP | 2013060123 A | 4/2013 |
| JP | 2016198843 A | 12/2016 |
| WO | 2018105599 A1 | 6/2018 |

OTHER PUBLICATIONS

International Search Report and Written Opinion for PCT/JP2020/025516 mailed Sep. 8, 2020, 7 pp.

Yohei Fujita et al., "Cooperative Behavior Control by Robot Communication Used CNP", The Robotics Society of Japan, Proceedings of the 24th Annual Conference of the robotics Soceity of Japan, 2006, 4 pp.

* cited by examiner

UNMANNED VEHICLE COOPERATION SYSTEM, UNMANNED VEHICLE COACTION PROCESSING METHOD, AND PROGRAM

RELATED APPLICATIONS

The present application is a National Phase of International Application Number PCT/JP2020/025516 filed Jun. 29, 2020 and claims priority of Japanese Application Number 2019-158885 filed Aug. 30, 2019.

TECHNICAL FIELD

The present invention relates to an unmanned vehicle cooperation system, an unmanned vehicle coaction processing method, and a program that perform a cooperation action involving human intervention between a plurality of agents including an unmanned vehicle.

BACKGROUND ART

In the related art, a control device for controlling an unmanned vehicle group including a plurality of unmanned vehicles is known (see, for example, PTL 1). The control device optimizes the behavior of the entire unmanned vehicle group while each of the vehicles constituting the unmanned vehicle group autonomously selects an action. Specifically, the control device acquires information on the own machine from the sensor mounted on the own machine, acquires information on another machine by communicating with the other machine, and uses the acquired information on the own machine and the other machine to calculate the amount of operation of the own machine.

CITATION LIST

Patent Literature

[PTL 1] International Publication No. 2018/105599

SUMMARY OF INVENTION

Technical Problem

As described above, in PTL 1, by controlling the operation of the own machine by using the information on the own machine and the other machine, the cooperation action between the plurality of unmanned vehicles is executed. Incidentally, human intervention may occur in executing a cooperation action by a plurality of unmanned vehicles. Examples of the case of human intervention include a case where a person monitors a cooperation action of a plurality of unmanned vehicles, a case where a person as a manned vehicle performs a cooperation action with an unmanned vehicle, and the like. In a case of human intervention during the cooperation action by the unmanned vehicle, it is difficult for the person to grasp the action of the unmanned vehicle, so that it is difficult to smoothly perform the cooperation action by the unmanned vehicle.

Therefore, an object of the present invention is to provide an unmanned vehicle cooperation system, an unmanned vehicle coaction processing method, and a program that make it easier for a person to grasp the operation of an unmanned vehicle and make it possible to perform a smooth cooperation action with the unmanned vehicle.

Solution to Problem

An unmanned vehicle cooperation system of the present invention is an unmanned vehicle cooperation system that performs a cooperation action involving human intervention between a plurality of agents including an unmanned vehicle, in which the unmanned vehicle has a processing unit that performs an action process of the unmanned vehicle with artificial intelligence using a decision-making model constructed by including a plurality of tasks, the plurality of tasks include a cooperation task for performing the cooperation action, and the processing unit executes a consensus building process that builds a consensus as to execution of the cooperation task between the agents using a negotiation protocol, and a cooperation action process that executes the cooperation action of the unmanned vehicle, based on the consented cooperation task.

Further, the unmanned vehicle coaction processing method of the present invention is an unmanned vehicle coaction processing method that performs a process regarding a cooperation action involving human intervention between a plurality of agents including an unmanned vehicle, in which an action process of the unmanned vehicle is performed with artificial intelligence using a decision-making model constructed by including a plurality of tasks, and the plurality of tasks include a cooperation task for performing the cooperation action, and the method includes a step of building a consensus as to execution of the cooperation task between the agents, using a negotiation protocol; and a step of executing the cooperation action of the unmanned vehicle, based on the consented cooperation task.

Further, the program of the present invention is a program for causing an unmanned vehicle to execute a process regarding a cooperation action involving human intervention between a plurality of agents including an unmanned vehicle, in which an action process of the unmanned vehicle is performed with artificial intelligence using a decision-making model constructed by including a plurality of tasks, and the plurality of tasks include a cooperation task for performing the cooperation action, and the program causes the unmanned vehicle to execute a step of building a consensus as to execution of the cooperation task between the agents, using a negotiation protocol, and a step of executing the cooperation action of the unmanned vehicle, based on the consented cooperation task.

Advantageous Effects of Invention

According to the present invention, it is possible for a person to easily grasp the operation of an unmanned vehicle and allow the unmanned vehicle to perform a smooth cooperation action.

DESCRIPTION OF EMBODIMENTS

Hereinafter, embodiments according to the present invention will be described in detail with reference to the drawings. In addition, the present invention is not limited to these embodiments. In addition, the components in the following embodiments include those that can be easily replaced by those skilled in the art, or those that are substantially the same. Further, the components described below can be appropriately combined, and when there are a plurality of embodiments, each embodiment can be combined.

Embodiment 1

An unmanned vehicle cooperation system 1 according to Embodiment 1 is a multi-agent system for performing a cooperation action between a plurality of agents including a person and unmanned vehicles 10. The unmanned vehicle cooperation system is a system capable of executing not only the cooperation action between the unmanned vehicles 10 but also the cooperation action between the person and the unmanned vehicle 10. In other words, the unmanned vehicle cooperation system is a system premised on human intervention.

(Unmanned Vehicle Cooperation System)

Figure 1:
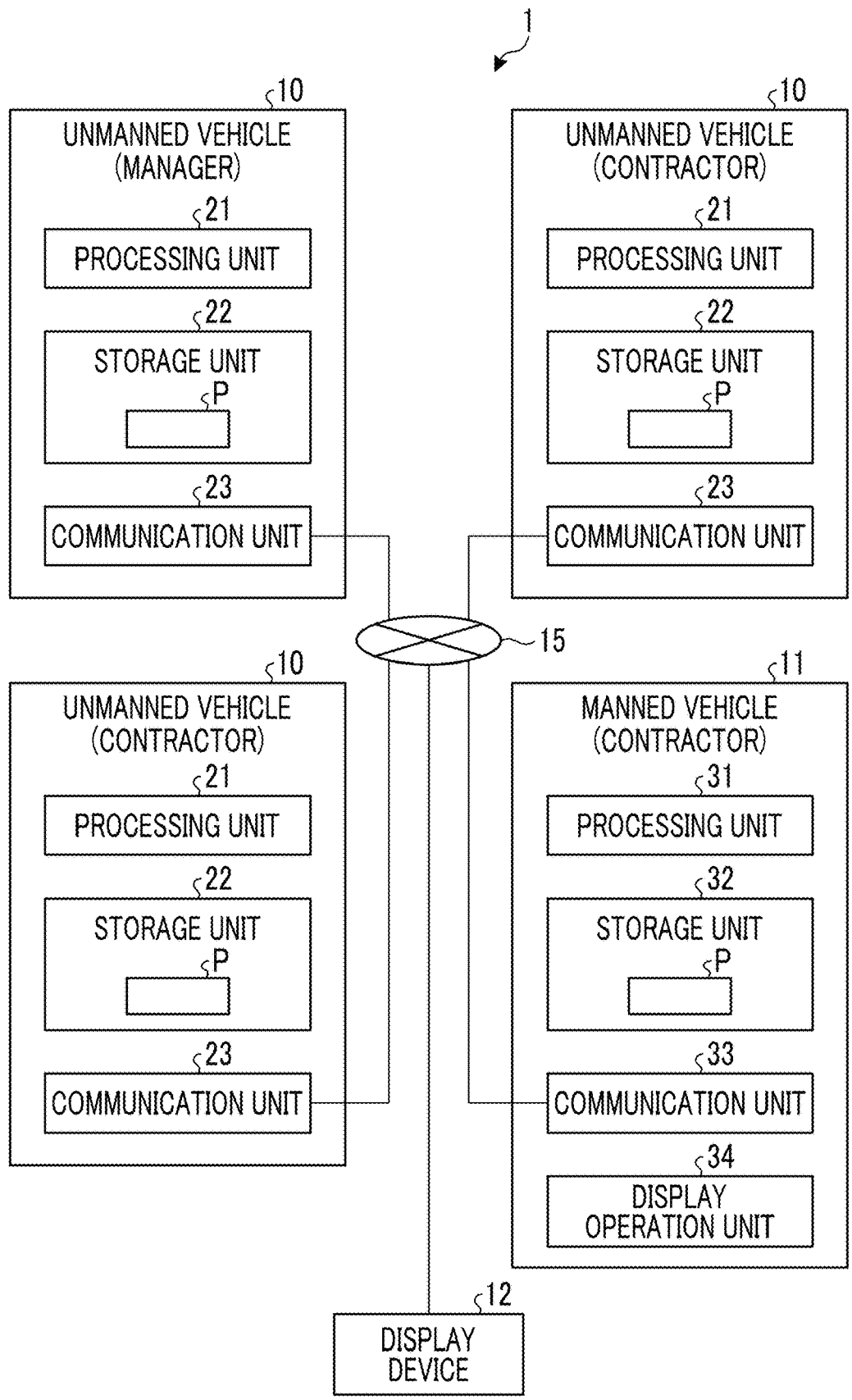
FIG. 1 is a schematic configuration diagram of an unmanned vehicle cooperation system according to Embodiment 1.

FIG. 1 is a schematic configuration diagram of an unmanned vehicle cooperation system according to Embodiment 1. As shown in FIG. 1, the unmanned vehicle cooperation system 1 includes unmanned vehicles 10, a manned vehicle 11, a display device 12, and a network 15. Since the unmanned vehicle cooperation system 1 is a system capable of executing cooperation actions between a person and the unmanned vehicle 10, in Embodiment 1, the system includes the manned vehicle 11 and the display device 12, but the system may not include the manned vehicle 11 and the display device 12.

The unmanned vehicle 10 is capable of operating autonomously, and one or more unmanned vehicles 10 are used. As the unmanned vehicle 10, for example, unmanned cars, unmanned aerial vehicles, unmanned ships, unmanned underwater ships, robots, or the like are applicable. The unmanned vehicle 10 includes a processing unit 21 that executes various programs and performs various processes, a storage unit 22 that stores various programs and data, and a communication unit 23 for communicating data.

The storage unit 22 stores, as various programs, for example, a program P that executes a process regarding the cooperation action of the unmanned vehicle 10. This program P is a program including a decision-making model 41 and a contract net protocol, which will be described later.

The processing unit 21 performs an action process of the unmanned vehicle 10 using artificial intelligence. As artificial intelligence, the decision-making model 41 constructed by including a plurality of tasks T is applied. In addition, the decision-making model will be described later. Further, the processing unit 21 uses a negotiation protocol to build a consensus with the other unmanned vehicle 10 and the manned vehicle 11. In addition, the negotiation protocol will also be described later.

The communication unit 23 is capable of bidirectional communication with the other unmanned vehicle 10 and the manned vehicle 11 via the network 15. The communication unit 23 is capable of wireless communication, for example.

The unmanned vehicle 10 as described above autonomously executes various operations in cooperation with the other unmanned vehicle 10 and the manned vehicle 11 by executing the program P stored in the storage unit 22.

The manned vehicle 11 is operated by an operator (person). As the manned vehicle 11, vehicles, aerial vehicles, ships, underwater ships, operable robots, or the like are applicable. In addition, although one manned vehicle 11 is shown in FIG. 1, the number of manned vehicles is not particularly limited. The manned vehicle 11 includes a processing unit 31 that executes various programs and performs various processes, a storage unit 32 that stores various programs and data, a communication unit 33 for communicating data, and a display operation unit 34 that displays information to the operator, and allows the operator to perform an input operation.

The storage unit 32 stores, as various programs, for example, a program P that executes a process regarding the cooperation action of the unmanned vehicle 10. This program P may be a program different from the program stored in the unmanned vehicle 10, and may be a program including at least a contract net protocol for negotiating with the unmanned vehicle 10. That is, since the manned vehicle 11 does not need to be able to operate autonomously, the program P may not include the decision-making model 41 to be described later.

The processing unit 31 performs action processes of the manned vehicle 11, based on the operator's operation that is input via the display operation unit 34. In addition, the processing unit 31 uses a negotiation protocol to build a consensus with the other unmanned vehicle 10. In addition, the negotiation protocol will be described later.

The communication unit 33 is the same as the communication unit 23, and is capable of bidirectional communication with the other unmanned vehicle 10 via the network 15. The communication unit 33 is capable of wireless communication, for example.

The display operation unit 34 is, for example, a device such as a touch panel display, which can display various screens and performs operations on the displayed various screens. In addition, in Embodiment 1, the display operation unit 34 is used, but the operation unit and the display unit may be independent of each other and are not particularly limited.

The display device 12 is such that a person monitors the unmanned vehicle 10 and the manned vehicle 11 and issues an operation command to the unmanned vehicle 10 and the manned vehicle 11. The display device 12 is connected to the network 15 and is capable of bidirectional communication with the unmanned vehicle 10 and the manned vehicle 11. Specifically, the display device 12 acquires and displays the information output from the unmanned vehicle 10 and the manned vehicle 11, and outputs an operation command to the unmanned vehicle 10 and the manned vehicle 11. The display device 12 may be provided remotely from the unmanned vehicle 10 and the manned vehicle 11, for example, and function as a remote terminal.

The network 15 connects the unmanned vehicle 10, the manned vehicle 11, and the display device 12 to each other, and is a network capable of bidirectional communication. The network 15 is, for example, a wireless communication network.

(Decision-Making Model)

Figure 2:
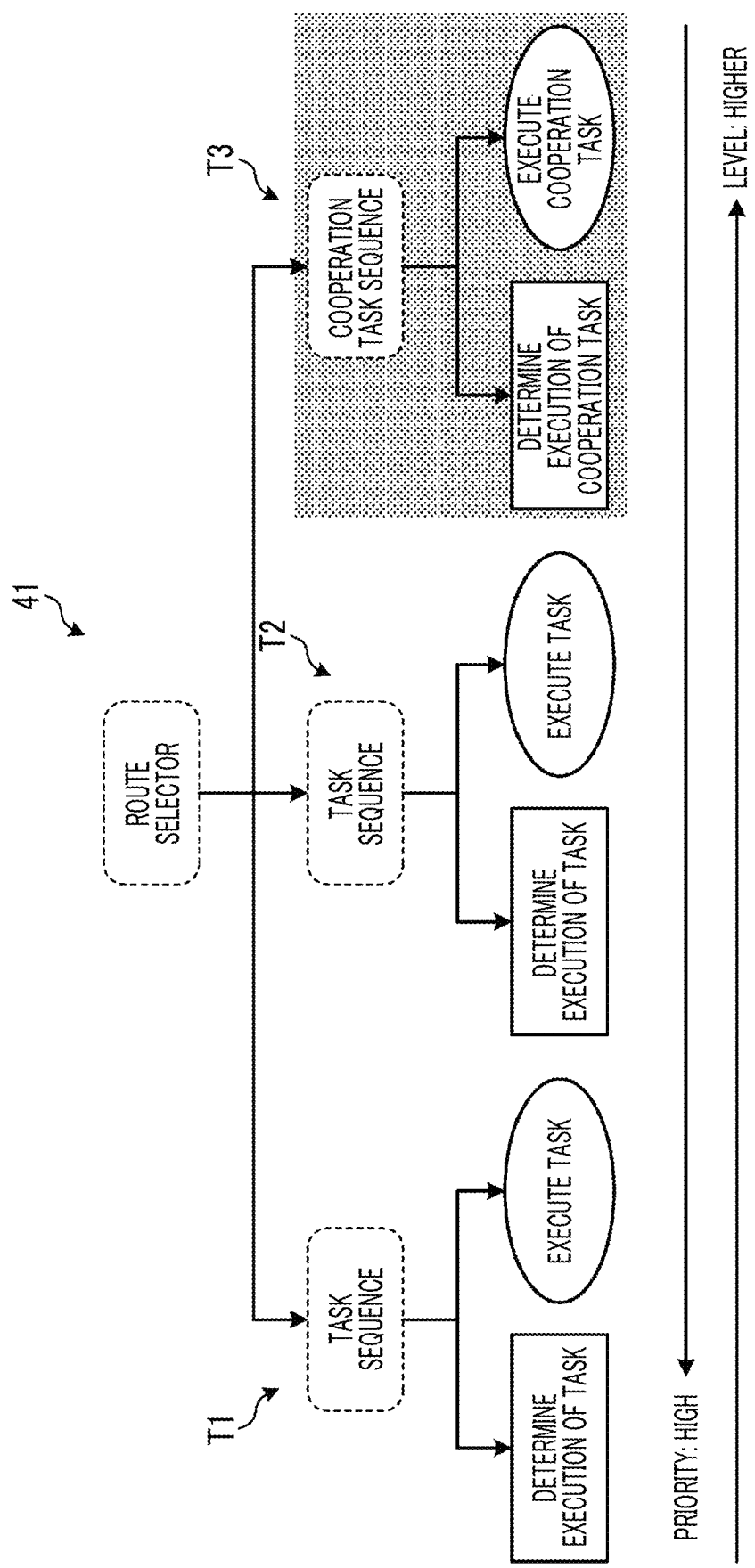
FIG. 2 is an explanatory diagram of a decision-making model used in the unmanned vehicle cooperation system of Embodiment 1.

Next, the decision-making model 41 used for artificial intelligence will be described with reference to FIG. 2. FIG. 2 is an explanatory diagram of a decision-making model used in the unmanned vehicle cooperation system of Embodiment 1. The decision-making model 41 is a model for autonomously operating the unmanned vehicle 10. The decision-making model 41 is constructed by including a plurality of tasks T1 to T3. The decision-making model 41 shown in FIG. 2 is a hierarchical decision-making model in which a plurality of tasks T1 to T3 are hierarchically constructed. In Embodiment 1, a hierarchical decision-making model called a behavior tree (BT) is used.

The decision-making model 41 includes a lower level in which the action of the unmanned vehicle 10 has a higher priority and a higher level in which the action of the unmanned vehicle 10 has a lower priority. In FIG. 2, the lower level (that is, the level with higher priority) is on the left side, and the higher level (that is, the level with lower priority) is on the right side.

The decision-making model 41 includes a task T1, a task T2, and a cooperation task T3 in descending order of priority. The number of tasks included in the decision-making model 41 is not particularly limited. Further, the decision-making model 41 includes a route selector, and the route selector is a node for starting execution. The route selector executes tasks from the lower-level task T1 to the higher-level task T3.

The cooperation task T3 is a task for performing a cooperation action with the other unmanned vehicle 10. Further, the cooperation task T3 is assigned to the higher level of the decision-making model 41 by building a consensus with the other unmanned vehicle 10 to execute the cooperation task. The task T2 is a task with a higher priority than the cooperation task T3, and the task T1 is a task with a higher priority than the task T2. Therefore, the cooperation task T3 is a task that is executed after the tasks T1 and T2 are preferentially performed. In addition, the tasks T1 and T2 include, for example, a task for avoiding obstacles or a task for ensuring the safety of the own machine.

As an example, each task T1 to T3 includes a task sequence node, a task execution determination node, and a task execution node. The task sequence node executes the task execution determination node, and when it is determined to execute the task, it transitions to the task execution node and executes the task.

In such a decision-making model 41, the route selector executes tasks from the lower-level task T1 in order, so that the tasks T1 and T2 are preferentially executed, and then the cooperation task T3 in the higher level is executed. In this way, in the unmanned vehicle 10, the cooperation action process for executing the cooperation action is performed based on the cooperation task T3.

(Negotiation Protocol)

Figure 3:
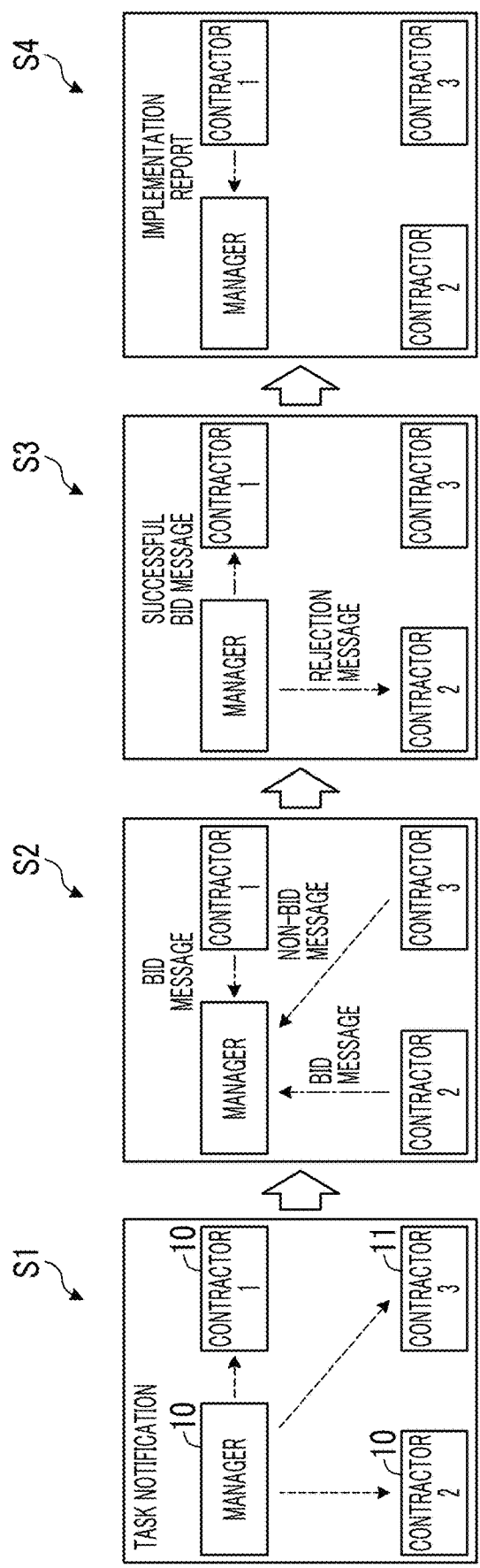
FIG. 3 is an explanatory diagram relating to a negotiation protocol used in the unmanned vehicle cooperation system of Embodiment 1.

Next, a negotiation protocol for conducting negotiations between agents will be described with reference to FIG. 3. FIG. 3 is an explanatory diagram relating to a negotiation protocol used in the unmanned vehicle cooperation system of Embodiment 1. The negotiation protocol is a protocol for building a consensus between agents including the unmanned vehicle 10 and the manned vehicle 11. In Embodiment 1, a protocol called a contract net protocol (CNP) is used as the negotiation protocol.

In the contract net protocol, a manager and contractors are set for a plurality of agents. In addition, the manager may be fixed to a predetermined agent or may be changed to any agent. In Embodiment 1, for example, as shown in FIG. 1, the unmanned vehicle 10 is set as a manager, and the remaining unmanned vehicles 10 and the manned vehicle 11 are set as contractors. Then, in the contract net protocol, a consensus is built between the contract net protocol and the contractor by executing a bid and a successful bid.

As shown in FIG. 3, when consensus is built between agents regarding the cooperation task T3, first, the unmanned vehicle 10 which is a manager (hereinafter, simply referred to as a manager) provides a notification of the cooperation task T3 to the remaining unmanned vehicle 10 and the manned vehicle 11 which are contractors (hereinafter, simply referred to as contractors) (step S1). That is, in step S1, information about the cooperation task T3, specifically, information such as the destination, the sender, the content of the task, the bidding conditions for the task, and the bid deadline for the task is transmitted from the manager to the contractors.

Next, when the contractors receive the notification of the cooperation task T3, the contractors determine whether or not to bid based on the notification of the cooperation task T3, transmits a bid message when bidding, and transmits a non-bid message when not bidding (step S2). In step S2, as a bid message, specifically, information such as a destination, a sender, whether or not to bid, and a response to the bid conditions is transmitted from the contractor to the manager. Further, in step S2, information such as a non-bid response is transmitted from the contractor to the manager as a non-bid message.

After that, when the manager receives the bid message and the non-bid message, the manager transmits a successful bid message to the contractor who can execute the cooperation task T3, based on the content of the bid message (step S3). On the other hand, the manager transmits a rejection message to the contractor who cannot execute the cooperation task T3, based on the content of the bid message. In step S3, as a successful bid message, specifically, information such as a destination, a sender, and a successful bid reply is transmitted from the manager to the contractor. Further, in step S3, as a rejection message, information such as a response to the rejection is transmitted from the manager to the contractor.

Then, when the contractor receives the successful bid message, the contractor executes the notified cooperation task T3 and transmits the execution result to the manager as an implementation report (step S4).

As described above, the contract net protocol is a negotiation protocol for negotiating a contract regarding the cooperation task T3 between the manager and the contractor. Then, the manager and the contractors execute the contract net protocol to execute a consensus building process for building a consensus as to the execution of the cooperation task T3 between the agents. In addition, in the above description, the case where the manager is the unmanned vehicle 10 has been described, but the manager may be a manned vehicle. In this case, the notification of the task, the successful bid message, and the rejection message may be transmitted manually by a person or may be transmitted automatically with artificial intelligence.

(Coaction Process on Manager Side)

Figure 4:
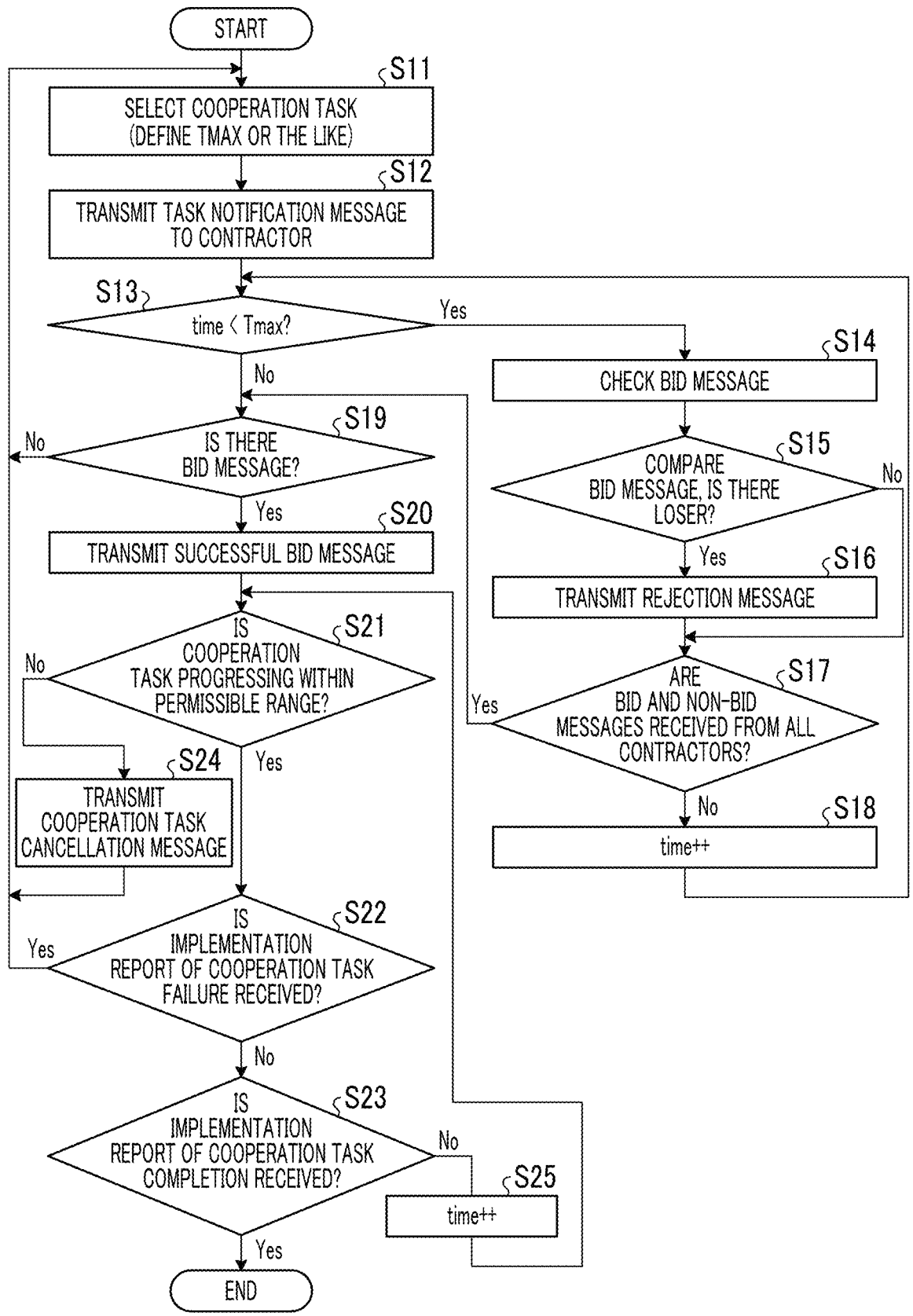
FIG. 4 is a flowchart relating to an unmanned vehicle coaction processing method on the manager side of the unmanned vehicle cooperation system of Embodiment 1.

Next, with reference to FIG. 4, the process regarding the cooperation action of the unmanned vehicle 10 using the decision-making model 41 and the contract net protocol will be described. FIG. 4 is a flowchart relating to an unmanned vehicle coaction processing method on the manager side of the unmanned vehicle cooperation system of Embodiment 1.

First, the manager selects the cooperation task T3 to be executed, based on various types of information acquired by the own machine (step S11). In step S11, the bid deadline (Tmax) of the cooperation task or the like are defined for the selected cooperation task T3. In addition, when defining the bid deadline, the bid deadline may be set depending on whether or not the cooperation task T3 assumes the participation of people. Specifically, in the case of the cooperation task T3 assuming the participation of people, the bid deadline is defined longer than in the case where the participation of people is not assumed. Subsequently, the manager transmits a message regarding the cooperation task T3 to the contractor in order to provide a notification of the selected cooperation task T3 (step S12).

Subsequently, the manager determines whether or not the current time (time) has reached the bid deadline (Tmax), based on "time<Tmax" (step S13). When the manager determines that the current time has not reached the bid deadline (step S13: Yes), the manager checks whether or not there is a bid message from the contractor and acquires it (step S14). On the other hand, when the manager determines that the current time has reached the bid deadline (step S13: No), the process proceeds to step S19, which will be described later.

When the bid message is acquired in step S14, the manager compares the acquired bid message with the bid conditions of the preset cooperation task T3 and determines whether or not there is a loser (step S15). In a case where there is a loser (step S15: Yes), the manager transmits a rejection message to the corresponding contractor (step S16), and then proceeds to the next step S17. On the other hand, in a case where there is no loser (step S15: No), the manager proceeds to the next step S17 without executing step S16. The manager releases the contractors who are rejected, by executing step S16.

In step S17, the manager determines whether or not the bid message and the non-bid message have been received from all the contractors. When the manager determines that the bid message and the non-bid message have not been received from all the contractors (step S17: No), the manager counts the time (step S18) and proceeds to step S13 again. On the other hand, when the manager determines that the bid message and the non-bid message have been received from all the contractors (step S17: Yes), the manager proceeds to step S19.

In step S19, the manager determines whether or not there is a bid message that has not been rejected. When the manager determines that there is a bid message that has not been rejected (step S19: Yes), the manager transmits a successful bid message to the corresponding contractor (step S20). On the other hand, when the manager determines that there is no bid message that has not been rejected (step S19: No), the manager considers that the selected cooperation task T3 cannot be executed and proceeds to step S11.

After executing step S20, the manager determines whether or not the cooperation task T3 is progressing within a permissible range (step S21). This is because the manager can reassign the cooperation task T3 when it is assumed that the cooperation task T3 is not progressing. When the manager determines that the cooperation task T3 is not progressing within the permissible range (step S21: No), the manager transmits a message to cancel the cooperation task T3 to the corresponding contractor (step S24), and proceeds to step S11. On the other hand, when the manager determines that the cooperation task T3 is progressing within the permissible range (step S21: Yes), the manager proceeds to step S22.

In step S22, the manager determines whether or not the implementation report regarding the failure of the cooperation task T3 has been received from the contractor. When the manager determines that the implementation report regarding the failure of the cooperation task T3 has been received from the contractor (step S22: Yes), the manager considers that the cooperation task T3 cannot be executed and proceeds to step S11. On the other hand, when the manager determines that the implementation report regarding the failure of the cooperation task T3 has not been received from the contractor (step S22: No), the manager determines whether or not the implementation report regarding the completion of the cooperation task T3 has been received from the contractor (step S23). When the manager determines that the implementation report regarding the completion of the cooperation task T3 has not been received from the contractor (step S23: No), the manager counts the time (step S25) and proceeds to step S21. When the manager determines that the implementation report regarding the completion of the cooperation task T3 has been received from the contractor (step S23: Yes), the manager ends the process regarding the cooperation action.

(Coaction Process on Contractor Side)

Figure 5:
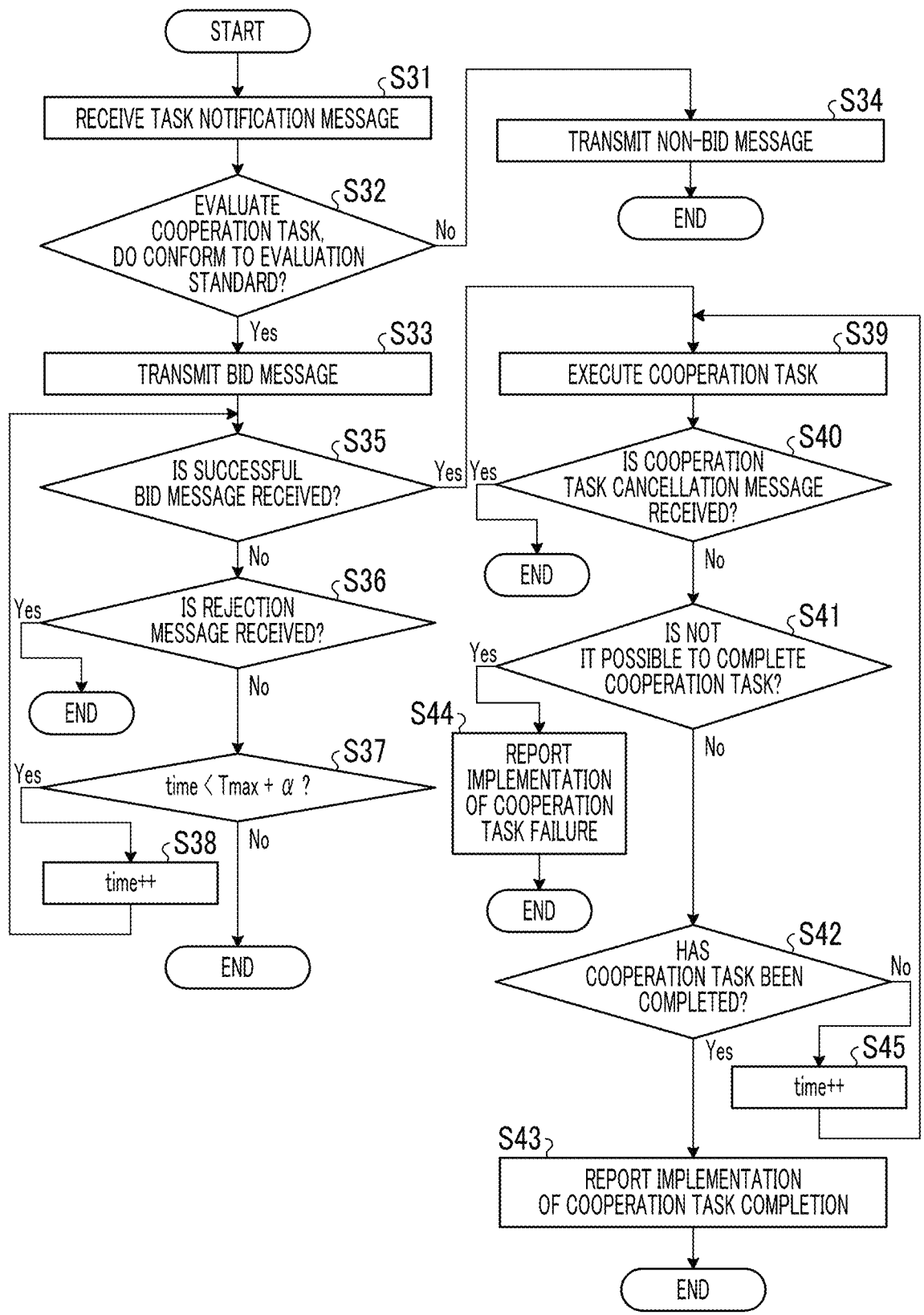
FIG. 5 is a flowchart relating to an unmanned vehicle coaction processing method on the contractor side of the unmanned vehicle cooperation system of Embodiment 1.

Next, with reference to FIG. 5, the process regarding the cooperation action of the unmanned vehicle 10 using the decision-making model 41 and the contract net protocol will be described. FIG. 5 is a flowchart relating to an unmanned vehicle coaction processing method on the contractor side of the unmanned vehicle cooperation system of Embodiment 1.

When the contractor receives the message regarding the notification of the cooperation task T3 from the manager (step S31), the contractor determines whether or not the received cooperation task T3 conforms to a preset value standard (or evaluation standard) (step S32). In addition, although the details will be described later, this value standard is a standard including a determination value for determining whether or not it is worth executing the cooperation task T3, and the determination value is a value standard obtained by learning. When the contractor determines that the received cooperation task T3 conforms to the value standard (step S32: Yes), the contractor transmits a bid message to the manager (step S33). On the other hand, when the contractor determines that the received cooperation task T3 does not conform to the value standard (step S32: No), the contractor transmits a non-bid message to the manager and ends the process regarding the cooperation action.

After executing step S33, the contractor determines whether or not a successful bid message has been received from the manager (step S35). When the contractor determines that the successful bid message has been received (step S35: Yes), the contractor proceeds to step S39, which will be described later. On the other hand, when the contractor determines that the successful bid message has not been received (step S35: No), the contractor determines whether or not the rejection message has been received from the manager (step S36). When the contractor determines that the rejection message has been received (step S36: Yes), the contractor ends the process regarding the cooperation action. On the other hand, when the contractor determines that the rejection message has not been received (step S36: No), the contractor determines whether or not the current time (time) has not reached the time (Tmax+α) considering the bid deadline, based on "time<Tmax+α" (step S37). When the contractor determines that the current time has not reached the time considering the bid deadline (step S37: Yes), the contractor counts the time (step S38) and proceeds to step S35. On the other hand, when the contractor determines that the current time has reached the time considering the bid deadline (step S37: No), the contractor ends the process regarding the cooperation action.

When in step S35, the contractor determines that the successful bid message has been received (step S35: Yes), the contractor executes the cooperation task (step S39). After executing step S39, the contractor determines whether or not a message regarding the cancellation of the cooperation task T3 has been received (step S40). When the contractor determines that the message regarding the cancellation of the cooperation task T3 has been received (step S40: Yes), the contractor ends the process regarding the cooperation action. On the other hand, when the contractor determines that the message regarding the cancellation of the cooperation task T3 has not been received (step S40: No), the contractor proceeds to step S41.

In step S41, the contractor determines whether or not the cooperation task T3 cannot be completed. When the contractor determines that the cooperation task T3 cannot be completed (step S41: Yes), the contractor transmits an implementation report regarding the failure of the cooperation task T3 to the manager (step S44), and ends the process regarding the cooperation action. On the other hand, when the contractor determines that the cooperation task T3 can be completed (step S41: No), the contractor determines whether or not the cooperation task T3 has been completed (step S42). When the contractor determines that the cooperation task T3 has not been completed (step S42: No), the contractor counts the time (step S45) and proceeds to step S39. On the other hand, when the contractor determines that the cooperation task T3 has been completed (step S42: Yes), the contractor transmits an implementation report regarding the completion of the cooperation task T3 to the manager (step S43), and ends the process regarding the cooperation action.

(Learning of Determination Value)

Here, the unmanned vehicles 10 as a manager and a contractor perform a learning process for learning a determination value for determining whether or not it is worth executing the cooperation task T3, based on the execution result of executing the cooperation task T3. The determination value is one of the factors for setting the value standard, and by introducing the value standard into the contract net protocol, it becomes possible to execute the allocation of the cooperation task T3 based on the value standard. In addition to the determination value, the value standard may be set by including a heuristic (set by a human) function. By introducing this value standard, it becomes possible for the manager to estimate whether or not the difference between the profit obtained by executing the cooperation task T3 and the disadvantage given to the contractor is beneficial. Further, it is possible for the contractor to estimate whether or not the notified cooperation task T3 is profitable with respect to the value standard.

(Display Screen)

Figure 6:
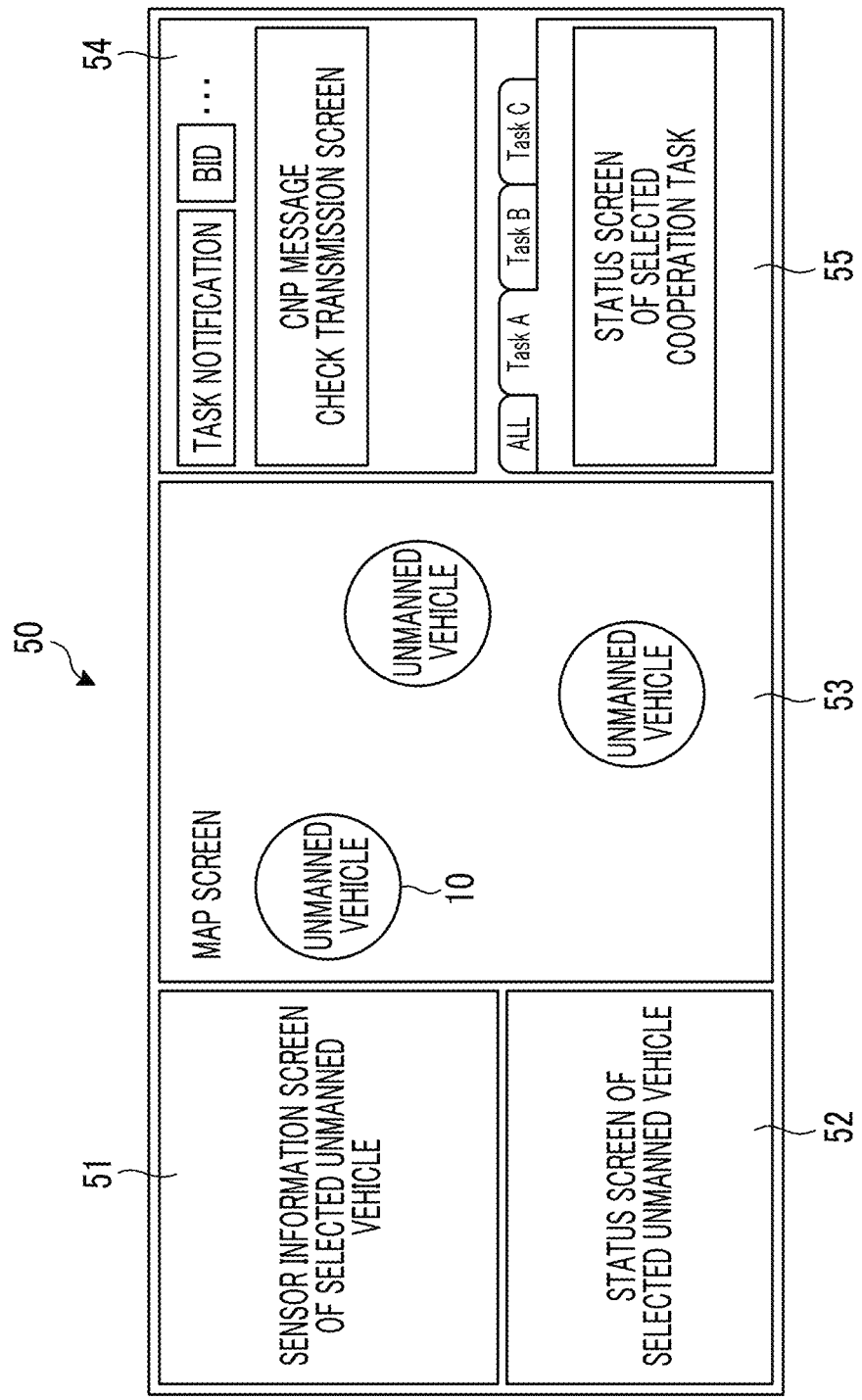
FIG. 6 is a diagram relating to a display screen.

Next, with reference to FIG. 6, a display screen used at the time of cooperation action will be described. FIG. 6 is a diagram relating to a display screen. The display screen 50 shown in FIG. 6 is a screen displayed on the display operation unit 34 of the manned vehicle 11 or the display device 12. That is, the display devices on which the display screen 50 is displayed are the display operation unit 34 of the manned vehicle 11 and the display device 12.

The display screen 50 includes a sensor information screen 51, a status screen 52 of the unmanned vehicle 10, a map screen 53, a CNP message screen 54, and a status screen 55 of the cooperation task T3. The sensor information screen 51 is a screen for displaying information acquired from a sensor provided in the unmanned vehicle 10. The status screen 52 of the unmanned vehicle 10 displays status information such as residual fuel of the unmanned vehicle 10, or displays information about tasks executed by the unmanned vehicle 10. Specifically, the status screen 52 displays, for example, the decision-making model 41 shown in FIG. 2, as information about the task. At this time, in the decision-making model 41, the task currently being executed may be visually displayed. For example, the task being executed may be blinked, or a color display indicating that the task is being executed may be performed.

Further, the map screen 53 displays information on topography around the unmanned vehicle 10 and the position information on the unmanned vehicle 10. In addition, the map screen 53 is linked to other screens 51, 52, 54, and 55. For example, by selecting the unmanned vehicle 10 on the map screen 53, information about the selected unmanned vehicle 10 is displayed on the screens 51, 52, 54, and 55.

The CNP message screen 54 displays information about a consensus building process using the contract net protocol. The CNP message screen 54 displays, for example, information about the notification of the cooperation task T3 and information about the bid, non-bid, rejection, and successful bid messages of the cooperation task T3. The status screen 55 of the cooperation task T3 displays the status information related to the cooperation task T3, and specifically displays information related to the progress of the cooperation task T3, the participants of the cooperation task T3, and the like.

As described above, according to Embodiment 1, by using the decision-making model 41, it is possible to easily manage the information on the task executed by the unmanned vehicle 10. In addition, information about the cooperation task T3 can be managed by performing a consensus building process for building a consensus as to the execution of the cooperation task T3 between agents, using the contract net protocol. From the above, since the action of the unmanned vehicle 10 can be easily grasped by a person, the cooperation action between the person and the unmanned vehicle 10 can be smoothly performed.

Further, according to Embodiment 1, a hierarchical decision-making model can be used as the decision-making model 41, and a behavior tree can be used as the hierarchical decision-making model. Therefore, each task T1 to T3 of the unmanned vehicle 10 can be managed for each level, and the tasks T1 to T3 can be easily managed even within the level. Therefore, assignment, editing, and the like of tasks T1 to T3 can be facilitated. In addition, the priority of each of the tasks T1 to T3 can be set according to the level.

Further, according to Embodiment 1, since the cooperation task T3 can be assigned to the higher level with a lower priority, the unmanned vehicle can execute the cooperation task T3 after performing a task such as avoiding an obstacle with a higher priority than the cooperation task T3.

Further, according to Embodiment 1, it is possible to determine whether or not to execute the cooperation task T3 based on the value standard including the learned determination value, so that it becomes possible to execute the cooperation task T3 that is beneficial to the manager and the contractor.

Further, according to Embodiment 1, the display screen 50 can be displayed on the display operation unit 34 of the manned vehicle 11 and the display device 12. Therefore, a person visually recognizes the display screen 50, and can easily grasp the task being executed by the unmanned vehicle 10, the information about the consensus building process, and the information about the cooperation task.

Further, according to Embodiment 1, the unmanned vehicle cooperation system 1 including not only the unmanned vehicle 10 but also the manned vehicle 11 can be obtained, so that the system can be a highly versatile system in which a person and an unmanned vehicle cooperate with each other.

Embodiment 2

Figure 7:
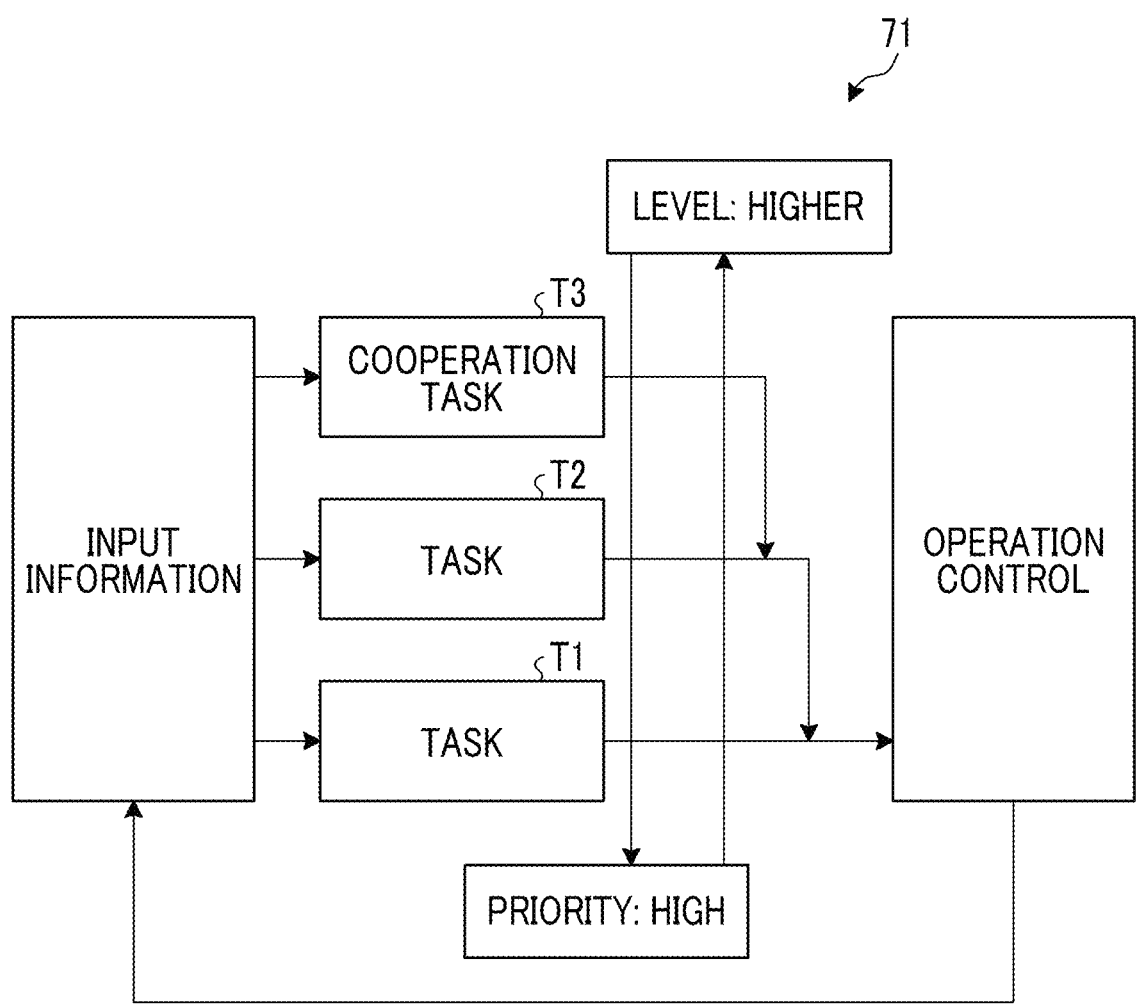
FIG. 7 is an explanatory diagram of a decision-making model used in an unmanned vehicle cooperation system of Embodiment 2.

Next, an unmanned vehicle cooperation system 1 according to Embodiment 2 will be described with reference to FIG. 7. In addition, in Embodiment 2, in order to avoid duplicate description, the parts different from Embodiment will be described, and the parts having the same configuration as Embodiment 1 will be described with the same reference numerals. FIG. 7 is an explanatory diagram of a decision-making model used in the unmanned vehicle cooperation system of Embodiment 2.

The unmanned vehicle cooperation system 1 of Embodiment 2 uses a decision-making model 71 instead of the decision-making model 41 of Embodiment 1.

(Decision-Making Model)

As shown in FIG. 7, the decision-making model 71 is a hierarchical decision-making model in which a plurality of tasks T1 to T3 are hierarchically constructed, and a hierarchical decision-making model called a subsumption architecture (SA) is used.

Similar to the decision-making model 41 of Embodiment 1, the decision-making model 71 includes a lower level in which the action of the unmanned vehicle 10 has a higher priority and a higher level in which the action of the unmanned vehicle 10 has a lower priority. In FIG. 7, the lower level (that is, the level with the higher priority) is on the lower side, and the higher level (that is, the level with the lower priority) is on the upper side.

The decision-making model 71 includes a task T1, a task T2, and a cooperation task T3 in descending order of priority. In addition, in the decision-making model 71, the cooperation task T3 is assigned to the higher level of the decision-making model 71.

Various types of information acquired by the unmanned vehicle 10 are input to the decision-making model 71 as input information, and the tasks T1 to T3 are executed based on the input information to control the action of the unmanned vehicle 10. Then, in the decision-making model 71, various types of information obtained after the operation control are input to each task T1 to T3 as input information.

As described above, according to Embodiment 2, the subsumption architecture can be used as the hierarchical decision-making model. Therefore, each task T1 to T3 of the unmanned vehicle 10 can be managed for each level, and the priority of tasks T1 to T3 can be set according to the level.

Embodiment 3

Figure 8:
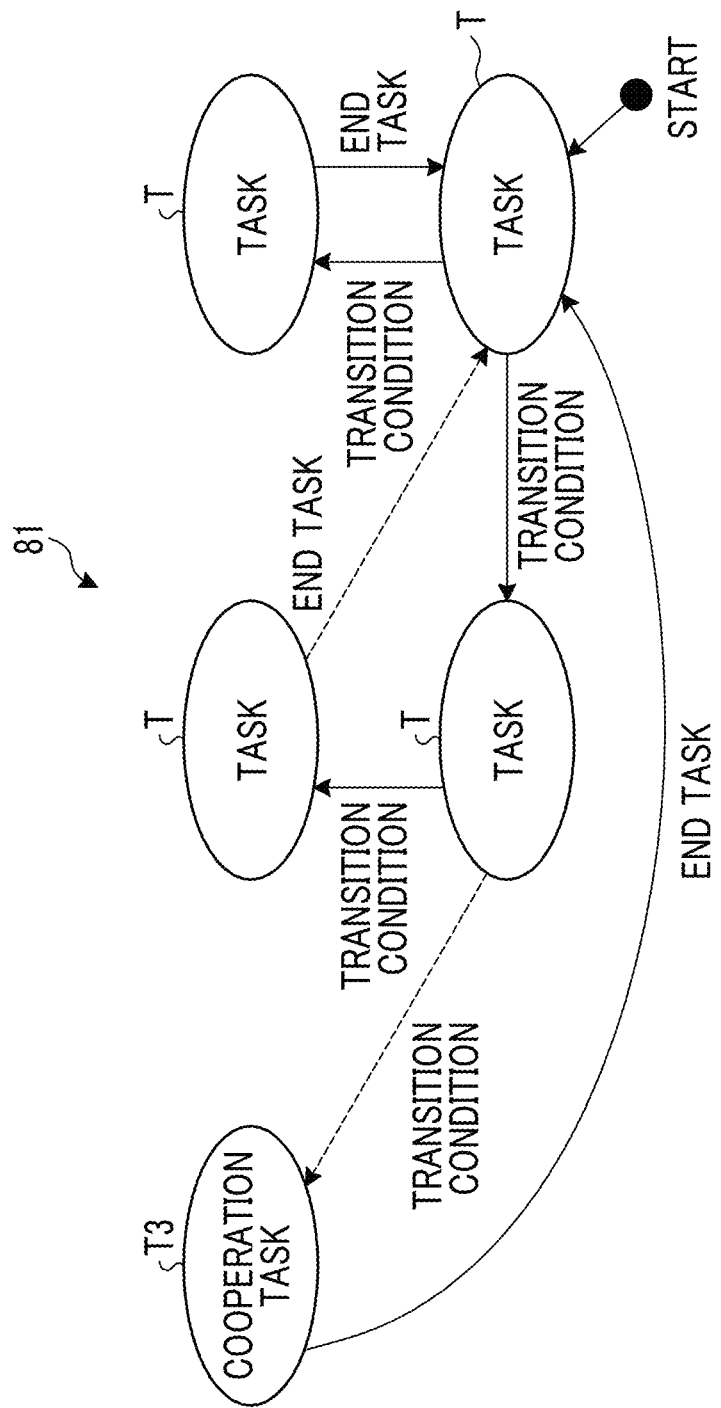
FIG. 8 is an explanatory diagram of a decision-making model used in an unmanned vehicle cooperation system of Embodiment 3.

Next, the unmanned vehicle cooperation system 1 according to Embodiment 3 will be described with reference to FIG. 8. In addition, even in Embodiment 3, in order to avoid duplicate description, the parts different from Embodiments 1 and 2 will be described, and the parts having the same configuration as those of Embodiments 1 and 2 will be described with the same reference numerals. FIG. 8 is an explanatory diagram of a decision-making model used in the unmanned vehicle cooperation system of Embodiment 3.

The unmanned vehicle cooperation system 1 of Embodiment 3 uses a decision-making model 81 instead of the decision-making model 41 of Embodiment 1.

The decision-making model 81 is a non-hierarchical decision-making model, unlike the decision-making model 41 of Embodiment 1. The decision-making model 81 is a finite state machine (FSM) constructed from a plurality of tasks (states) T and transition conditions that are conditions for transitioning between tasks.

The decision-making model 81 includes a start, a plurality of tasks T, and a cooperation task T3. The decision-making model 81 transitions from the start to a predetermined task T, transitions to the task T and the cooperation task T3 according to the predetermined transition conditions, and returns to the predetermined task when the task is completed. The cooperation task T3 is provided at a position away from the start, and a plurality of tasks T are disposed between the start and the cooperation task T3.

As described above, according to Embodiment 3, a finite state machine can be used as a non-hierarchical decision-making model. Therefore, when the number of tasks executed by the unmanned vehicle 10 is small, a simple decision-making model can be constructed by using the finite state machine.

In addition, in Embodiments 1 to 3, various decision-making models are used, but in addition to these decision-making models, for example, a decision-making model using a decision tree may be applied.

Further, in Embodiments 1 to 3, the contract net protocol is used as the negotiation protocol, but the protocol is not particularly limited. For example, as a negotiation protocol, a protocol such as "Auction Based Negotiation Protocol" or "Market-based approach" may be used.

REFERENCE SIGNS LIST

1 Unmanned vehicle cooperation system
10 Unmanned vehicle
11 Manned vehicle
12 Display device
15 Network
21 Processing unit
22 Storage unit
23 Communication unit
31 Processing unit
32 Storage unit
33 Communication unit
34 Display operation unit
41 Decision-making model
50 Display screen
51 Sensor information screen
52 Unmanned vehicle status screen
53 Map screen
54 CNP message screen
55 Status screen of cooperation task
71 Decision-making model
81 Decision-making model
P Program
T1, T2(T) Task
T3 Cooperation task

The invention claimed is:
1. An unmanned vehicle cooperation system for performing a cooperation action involving human intervention between a plurality of agents, the unmanned vehicle cooperation system comprising:

the plurality of agents including
a manned vehicle that is an aerial vehicle and operated by a person; and
an unmanned vehicle that is an aerial vehicle and having a processor configured to perform an action process of the unmanned vehicle with artificial intelligence using a decision-making model constructed by including a plurality of tasks, wherein
the decision-making model is a hierarchical decision-making model in which the plurality of tasks is hierarchically constructed,
the plurality of tasks includes a cooperation task for performing the cooperation action, and
the cooperation task has a hierarchy of lower priority than a task for avoiding obstacles and a task for ensuring the safety of the unmanned vehicle; and
a display device configured to display information about, among the plurality of tasks, a task being executed by the unmanned vehicle, wherein
the processor is configured to execute
a consensus building process that builds a consensus as to execution of the cooperation task between the plurality of agents using a negotiation protocol, and
a cooperation action process that executes the cooperation action of the unmanned vehicle, based on the consented cooperation task,
the plurality of agents includes
a manager, being the manned vehicle or the unmanned vehicle, configured to announce the cooperation task, and
a contractor, being the manned vehicle or the unmanned vehicle, configured to make a contract for execution of the cooperation task announced by the manager,
the negotiation protocol is a contract net protocol (CNP) for negotiating the contract regarding the cooperation task between the manager and the contractor,
in the consensus building process,
the manager and the contractor are set for the plurality of agents, and
the contract regarding the cooperation task is negotiated between the manager and the contractor,
in the consensus building process, the contractor is further configured to,
in response to receiving the announcement of the cooperation task, determine whether or not to bid for the contract based on the announcement,
in response to determining to bid for the contract, transmit a bid message to the manager, and
in response to determining not to bid for the contract, transmit a non-bid message to the manager,
the display device is further configured to display information about the consensus building process and information about the cooperation task,
the manager is capable of being changed to any agent of the plurality of agents, and
the manager is configured to, in response to determining that an implementation report regarding a failure of the cooperation task has not been received from the contractor and the implementation report regarding a completion of the cooperative task has been received from the contractor, end the cooperation action process.

2. The unmanned vehicle cooperation system according to claim 1, wherein
the hierarchical decision-making model includes
a lower level in which an action of the unmanned vehicle has a higher priority and
a higher level in which the action of the unmanned vehicle has a lower priority, and
the cooperation task is assigned to the higher level of the hierarchical decision-making model.

3. The unmanned vehicle cooperation system according to claim 1, wherein
the hierarchical decision-making model is a behavior tree (BT).

4. The unmanned vehicle cooperation system according to claim 1, wherein
the hierarchical decision-making model is a subsumption architecture (SA).

5. The unmanned vehicle cooperation system according to claim 1, wherein
the decision-making model is a finite state machine (FSM) constructed from the plurality of tasks and transition conditions that are conditions for transitioning between the plurality of tasks.

6. The unmanned vehicle cooperation system according to claim 1, wherein
the processor is further configured to
execute a learning process for learning a determination value for determining whether or not it is worth executing the cooperation task, based on an execution result of executing the cooperation task, and
in the consensus building process, determine whether or not to execute the cooperation task, based on a value standard including the determination value obtained by learning in the learning process.

7. The unmanned vehicle cooperation system according to claim 1, wherein
the plurality of agents includes a plurality of contractors including the contractor, and
in the consensus building process, the manager is configured to,
in response to receiving the bid message from one of the plurality of contractors executing the cooperation task, transmit a successful bid message to said one of the plurality of contractors, and
in response to receiving the bid message from another of the plurality of contractors not executing the cooperation task, transmit a rejection message to said another of the plurality of contractors.

8. An unmanned vehicle coaction processing method of performing a process regarding a cooperation action involving human intervention between a plurality of agents, wherein
the plurality of agents includes
a manned vehicle that is an aerial vehicle and operated by a person, and
an unmanned vehicle that is an aerial vehicle and having a processor performing an action process of the unmanned vehicle with artificial intelligence using a decision-making model constructed by including a plurality of tasks,
the decision-making model is a hierarchical decision-making model in which the plurality of tasks is hierarchically constructed,
the plurality of tasks includes a cooperation task for performing the cooperation action, and
the cooperation task has a hierarchy of lower priority than a task for avoiding obstacles and a task for ensuring the safety of the unmanned vehicle,
the unmanned vehicle coaction processing method comprising:

building a consensus as to execution of the cooperation task between the plurality of agents, using a negotiation protocol; and executing the cooperation action of the unmanned vehicle, based on the consented cooperation task, wherein the plurality of agents includes a manager, being the manned vehicle or the unmanned vehicle, announcing the cooperation task, and a contractor, being the manned vehicle or the unmanned vehicle, making a contract for execution of the cooperation task announced by the manager, the negotiation protocol is a contract net protocol (CNP) for negotiating the contract regarding the cooperation task between the manager and the contractor, the building of the consensus includes setting the manager and the contractor for the plurality of agents, and negotiating the contract regarding the cooperation task between the manager and the contractor, the building of the consensus further includes in response to the contractor receiving the announcement of the cooperation task, determining, by the contractor, whether or not to bid for the contract based on the announcement, in response to the contactor determining to bid for the contract, transmitting, by the contractor, a bid message to the manager, and in response to the contractor determining not to bid for the contract, transmitting, by the contractor, a non-bid message to the manager, the unmanned vehicle coaction processing method further comprises displaying, by a display device, (i) information about, among the plurality of tasks, a task being executed by the unmanned vehicle, (ii) information about the building of the consensus, and (iii) information about the cooperation task, the manager is capable of being changed to any agent of the plurality of agents, and the manager is configured to, in response to determining that an implementation report regarding a failure of the cooperation task has not been received from the contractor and the implementation report regarding a completion of the cooperative task has been received from the contractor, end the cooperation action process.

9. A non-transitory computer readable medium storing a program for causing an unmanned vehicle to execute a process regarding a cooperation action involving human intervention between a plurality of agents, wherein the plurality of agents includes a manned vehicle that is an aerial vehicle and operated by a person, and the unmanned vehicle that is an aerial vehicle and having a processor performing an action process of the unmanned vehicle with artificial intelligence using a decision-making model constructed by including a plurality of tasks, the decision-making model is a hierarchical decision-making model in which the plurality of tasks is hierarchically constructed, the plurality of tasks includes a cooperation task for performing the cooperation action, and the cooperation task has a hierarchy of lower priority than a task for avoiding obstacles and a task for ensuring the safety of the unmanned vehicle, the program causes the unmanned vehicle to execute:

building a consensus as to the execution of the cooperation task between the plurality of agents, using a negotiation protocol; and executing the cooperation action of the unmanned vehicle, based on the consented cooperation task, wherein the plurality of agents includes a manager, being the manned vehicle or the unmanned vehicle, announcing the cooperation task, and a contractor, being the manned vehicle or the unmanned vehicle, making a contract for execution of the cooperation task announced by the manager, the negotiation protocol is a contract net protocol (CNP) for negotiating the contract regarding the cooperation task between the manager and the contractor, the building of the consensus includes setting the manager and the contractor for the plurality of agents, and negotiating the contract regarding the cooperation task between the manager and the contractor, the building of the consensus further includes in response to the contractor receiving the announcement of the cooperation task, determining, by the contractor, whether or not to bid for the contract based on the announcement, in response to the contactor determining to bid for the contract, transmitting, by the contractor, a bid message to the manager, and in response to the contractor determining not to bid for the contract, transmitting, by the contractor, a non-bid message to the manager, the program further causes the unmanned vehicle to communicate with a display device, and the display device is configured to display (i) information about, among the plurality of tasks, a task being executed by the unmanned vehicle, (ii) information about the building of the consensus, and (iii) information about the cooperation task, the manager is capable of being changed to any agent of the plurality of agents, and the manager is configured to, in response to determining that an implementation report regarding a failure of the cooperation task has not been received from the contractor and the implementation report regarding a completion of the cooperative task has been received from the contractor, end the cooperation action process.

10. The unmanned vehicle coaction processing method according to claim 8, wherein the plurality of agents includes a plurality of contractors including the contractor, and the building of the consensus further includes in response to the manager receiving the bid message from one of the plurality of contractors executing the cooperation task, transmitting, by the manager, a successful bid message to said one of the plurality of contractors, and in response to the manager receiving the bid message from another of the plurality of contractors not executing the cooperation task, transmitting, by the manager, a rejection message to said another of the plurality of contractors.

11. The non-transitory computer readable medium according to claim 9, wherein the plurality of agents includes a plurality of contractors including the contractor, and the building of the consensus further includes in response to the manager receiving the bid message from one of the plurality of contractors executing the cooperation task, transmitting, by the manager, a successful bid message to said one of the plurality of contractors, and in response to the manager receiving the bid message from another of the plurality of contractors not executing the cooperation task, transmitting, by the manager, a rejection message to said another of the plurality of contractors.

\* \* \* \* \*